US011531986B2

(12) United States Patent
Eirinberg et al.

(10) Patent No.: US 11,531,986 B2
(45) Date of Patent: Dec. 20, 2022

(54) CROSS-PLATFORM DATA MANAGEMENT AND INTEGRATION

(71) Applicant: Snap Inc., Santa Monica, CA (US)

(72) Inventors: Dylan Shane Eirinberg, Venice, CA (US); Matthew COlin Grantham, Toronto (CA); Krish Jayaram, Santa Monica, CA (US); Patrick Mandia, Venice, CA (US); Colin Usala, Lake Forest Park, WA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/039,772

(22) Filed: Sep. 30, 2020

(65) Prior Publication Data

US 2022/0101309 A1     Mar. 31, 2022

(51) Int. Cl.
*G06Q 20/38*     (2012.01)
*G06Q 20/40*     (2012.01)
*G06Q 30/06*     (2012.01)

(52) U.S. Cl.
CPC ......... *G06Q 20/386* (2020.05); *G06Q 20/384* (2020.05); *G06Q 20/389* (2013.01); *G06Q 20/401* (2013.01); *G06Q 30/0613* (2013.01); *G06Q 30/0641* (2013.01)

(58) Field of Classification Search
CPC ............... G06Q 20/386; G06Q 20/384; G06Q 20/389; G06Q 20/401; G06Q 30/0613; G06Q 30/0641

USPC .......................................................... 705/39
See application file for complete search history.

(56) References Cited

U.S. PATENT DOCUMENTS

| 11,120,420 B2* | 9/2021 | Maddern ............ G06Q 30/0601 |
| 2012/0158589 A1 | 6/2012 | Katzin et al. |
| 2018/0189777 A1* | 7/2018 | Grassadonia ........ G06Q 20/326 |
| 2018/0315051 A1 | 11/2018 | Hurley et al. |

FOREIGN PATENT DOCUMENTS

WO     WO-2022072189 A1     4/2022

OTHER PUBLICATIONS

"WeChat applet promotion strategies of small shops," by Peng Li. 2020 IEEE International Conference on E-Commerce and Internet Technology (ECIT). Apr. 22, 2020. pp. 273-276. (Year: 2020).*

(Continued)

*Primary Examiner* — Sara C Hamilton
(74) *Attorney, Agent, or Firm* — Schwegman Lundberg & Woessner, P.A.

(57) ABSTRACT

A method and a system include receiving a request to process a transaction, identifying, by the messaging application, transactional data based on the request, the transactional data corresponding to a user profile associated with the client device in an entity graph, determining a first desensitized data item associated with the user profile being included in the transactional data, providing for display a first user interface of the messaging application including a first user-selectable element corresponding to a completion of the transaction, receiving an indication of user selection of the first user-selectable element, and transmitting the transactional data to a secured processor.

20 Claims, 16 Drawing Sheets

(56) References Cited

OTHER PUBLICATIONS

"Symbolic interaction: Customer, Lifestyle and Store App embedded in WeChat," by Hsin-Pey Peng. 2019 IEEE International Conference on Consumer Electronics—Taiwan (ICCE-TW). May 20, 2019. pp. 1-2. (Year: 2019).*
"International Application Serial No. PCT/US2021/051426, International Search Report dated Dec. 23, 2021", 4 pgs.
"International Application Serial No. PCT/US2021/051426, Written Opinion dated Dec. 23, 2021", 9 pgs.

* cited by examiner

CROSS-PLATFORM DATA MANAGEMENT AND INTEGRATION

BACKGROUND

Electronic messaging, particularly instant messaging, continues to grow globally in popularity. Users are quickly able to share with one another electronic media content items, including text, electronic images, audio, and video instantly. With the increasing number of users on social networking systems, each user also has a growing network of individuals that she follows. Therefore, in order to maintain the user engagement on social networking systems, it is paramount that the systems have the ability to integrate transaction functions into the system, to provide a comprehensive social solution for the users to connect and interact beyond merely exchanging media content items.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
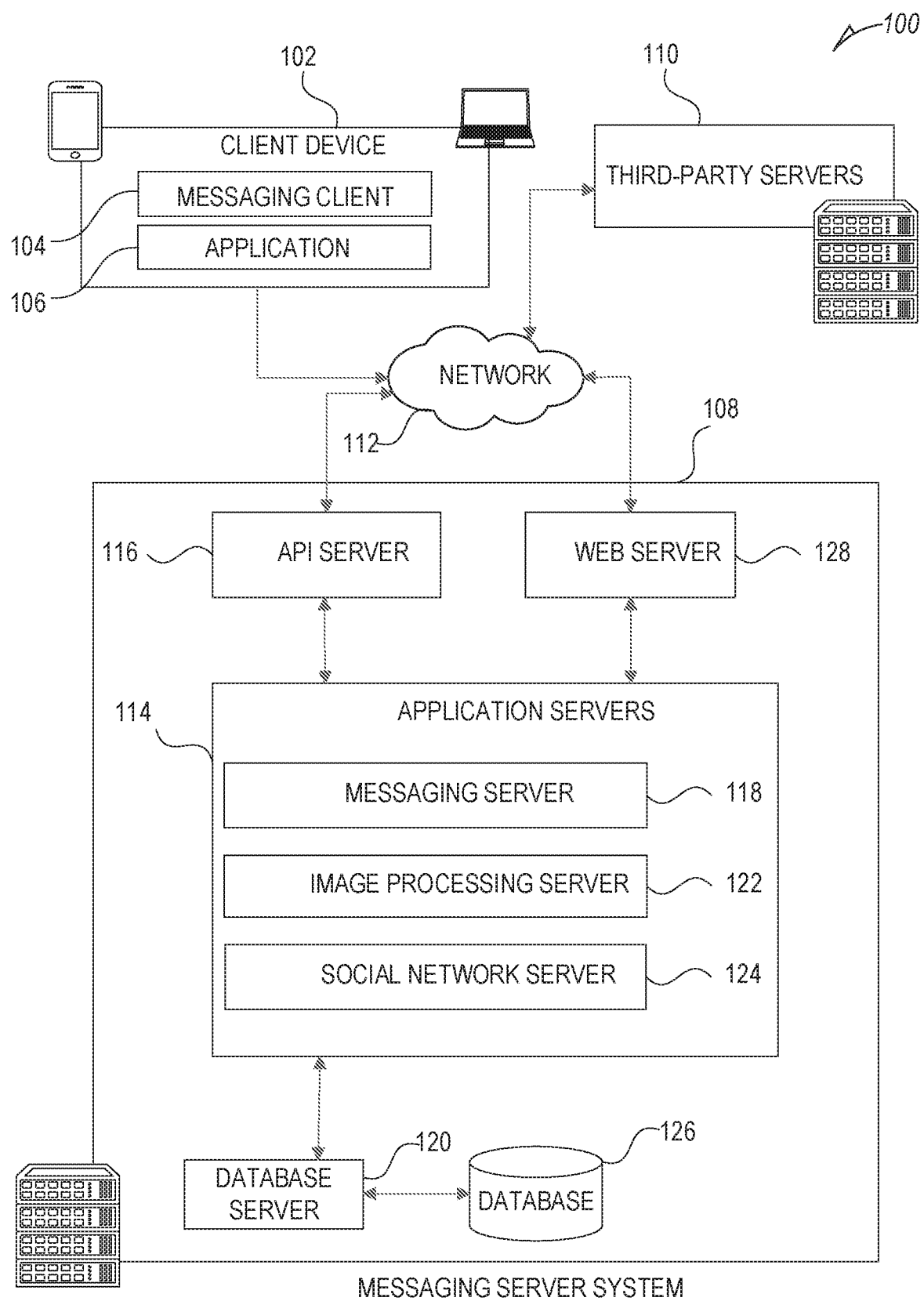
FIG. 1 is a diagrammatic representation of a networked environment in which the present disclosure may be deployed, in accordance with some examples.

In messaging systems, users are connected to a variety of other users with whom they have different levels and types of relationships. The social networking systems are presented with the challenge of providing an integrated, simplified, and secured payment transaction function to allow users to purchase merchandise while maintaining the social interactions with other users in the messaging systems.

Embodiments of the present disclosure improve the functionality of electronic messaging software and systems by providing users a secured and optimal payment flow for commercial transactions. Specifically, the messaging system may incorporate external web-based resources (e.g., mini-programs) developed by third parties into the ecosystem to provide users with advanced features, such as e-commerce, task management, etc. The messaging system also handles payment processing via a secured and PCI compliant payment processor (e.g., payment gateway) that resides in a remote system agnostic to the messaging system. Thereby a payment flow is securely managed across multiple platforms for optimal user experience. In addition, the embodiments of the present disclosure also improve the functionality by maintaining social interactions with other users who are involved in decision making while advancing the process of such commercial transactions. Specifically, users may continue engaging in a conversation while selecting merchandise to purchase in the user interface of the mini-programs. For example, the messaging system allows users to continue sending each other messages in the user interface of a movie reservation mini-program to maintain the discussion of a movie ticket to purchase and seats to choose.

In one embodiment, upon receiving a request from a requesting user via a mini-program to process a payment transaction, the messaging system identifies if all transactional data associated with the requesting user is available. The transactional data may include username, contact information, billing address, shipping address, and payment tokens (e.g., the first desensitized data item). Each payment token stored in the messaging system is associated with a token identifier. Payment card information is subject to Payment Card Industry "PCI" compliance standards, which require merchants to stores such sensitive information in a secure manner to reduce the likelihood of data breaches and fraudulent actions. The messaging system does not store payment card information. Instead, it stores the corresponding desensitized data items, such as payment tokens. A payment token is a reference or an identifier of sensitive data (e.g., payment card information) as a result of the tokenization process. Tokenization is a process of substituting a sensitive data element with a non-sensitive equivalent, such as a payment token, that has no extrinsic or exploitable meaning or value.

In one embodiment, for each payment transaction, the messaging system causes the payment processor to generate a single-transaction payment token (e.g., the second desensitized data item). The single-transaction payment token is specific to each transaction a user authorizes, independent from the first desensitized payment token generated by the secured payment processor. In one embodiment, the messaging system determines if the mini-program associated with the pending transaction is registered with the secured payment processor (e.g., the secured processor). The determination may be based on the verification process of the registration status returned by the secured payment processor. The registration status may indicate if the mini-program is partnered with the secured payment processor by utilizing their services, such as payment processing, payment card vaulting, etc. If the mini-program is registered with the secured payment processor, the messaging system causes the secured payment processor to generate reference metadata corresponding to the first desensitized data item. The reference metadata serves as a pointer to the actual payment card information (e.g., sensitive data item) entered by the user. The secured payment processor generates a second desensitized data item that is compatible with the system of the mini-program based on the reference metadata, and returns the data item to the messaging system.

In one embodiment, if the mini-program is not registered, or unregistered with the secured payment processor, that it is instead registered or partnered with another payment processor (e.g., a second payment processor), the messaging system may cause the secured payment processor to generate a single-use data item (e.g., one-time-use card) and forward the single-use data item to the second payment processor. The messaging system may receive, either from the secured payment processor or directly from the second payment processor, a single-transaction payment token (e.g., the second desensitized data item) generated by the second payment processor based on the single-use data item. The messaging system may transmit the second desensitized data item in conjunction with the transactional data to the secured payment processor for payment processing. In one embodiment, the single-use data item generated by the secured payment processor includes a payment card number with the last four digits identical to the last four digits of the actual payment card number (e.g., transaction instrument identifier) entered by the user.

In one embodiment, the messaging system stores the single-transaction payment token (e.g., the second desensitized data item) in the database. The single-transaction payment token is for one-time use only and is specific to each transaction a user has authorized to proceed. Unlike the first desensitized data item, the second desensitized data item may not be included in the transactional data in the future payment transactions.

In one embodiment, upon determination of missing transactional data, or upon user selection to enter updated transactional data, the system 216 generates one or more user interfaces (e.g., "onboarding sheet") to receive new or updated data.

In one embodiment, upon determination of a lack of desensitized data item (e.g., payment token) from transactional data, or a user selection to update payment card information, the messaging system generates a plurality of text input fields (e.g., the first set of data entry elements) for receiving such payment card information (e.g., sensitive data items). Upon receiving user input of the sensitive data items, without storing them in the database 126, the messaging system transmits the sensitive data items directly to the secured payment processor. The tokenization process is carried out by the payment processor (e.g., the secured processor or the second payment processor) and the associated system, which is agnostic to the messaging system. Upon receiving the desensitized data item from the payment processor, the messaging system stores it in a connected database.

In one embodiment, once the messaging system determines that all transactional data are available, the messaging system provides for display a first user interface that includes an overview of the transactional data, and an interactive (e.g., slidable) user interface element (e.g., a first user-selectable element) corresponding to a completion of the payment transaction. Upon receiving an indication of user selection of the interactive user interface element representing a user decision to complete the transaction, the messaging system forwards the transactional data to a secured payment processor. In one embodiment, the payment processor may be hosted by a system independent from the messaging system. In another embodiment, the payment processor may be hosted by a third party that developed the mini-program associated with the payment transaction.

In one embodiment, where there are multiple payment tokens representing multiple payment cards associated with a requesting user, the messaging system determines a most recent desensitized data item generated by the secured processor or the most recent desensitized data item being involved in a previous payment transaction.

In one embodiment, once the transactional data is transmitted by the messaging system to the secured payment processor, the messaging system may receive a transaction status indicating whether the payment has been successfully processed. If the returned transaction status indicates a complete transaction, the messaging system may provide for a display of a user interface that includes a third user interface element in conjunction with a text display of "done," or "payment successful," indicating a complete transaction. If the returned transaction status indicates an incomplete transaction, the messaging system may provide for a display of a user interface that includes a user interface element in conjunction with a text display of "transaction not completed," indicating an incomplete transaction.

In one embodiment, upon receiving the transaction status indicating a complete payment transaction, the processor informs the web-based external resource (e.g., mini-program) to finalize the requested transaction. Finalizing the requested transaction may include completing any remaining process associated with the transactions upon a successful payment transaction, such as completing the reservation of the movie tickets, and sending the requesting user the reserved movie tickets via emails or messages, etc.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108, and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104, where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke the functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
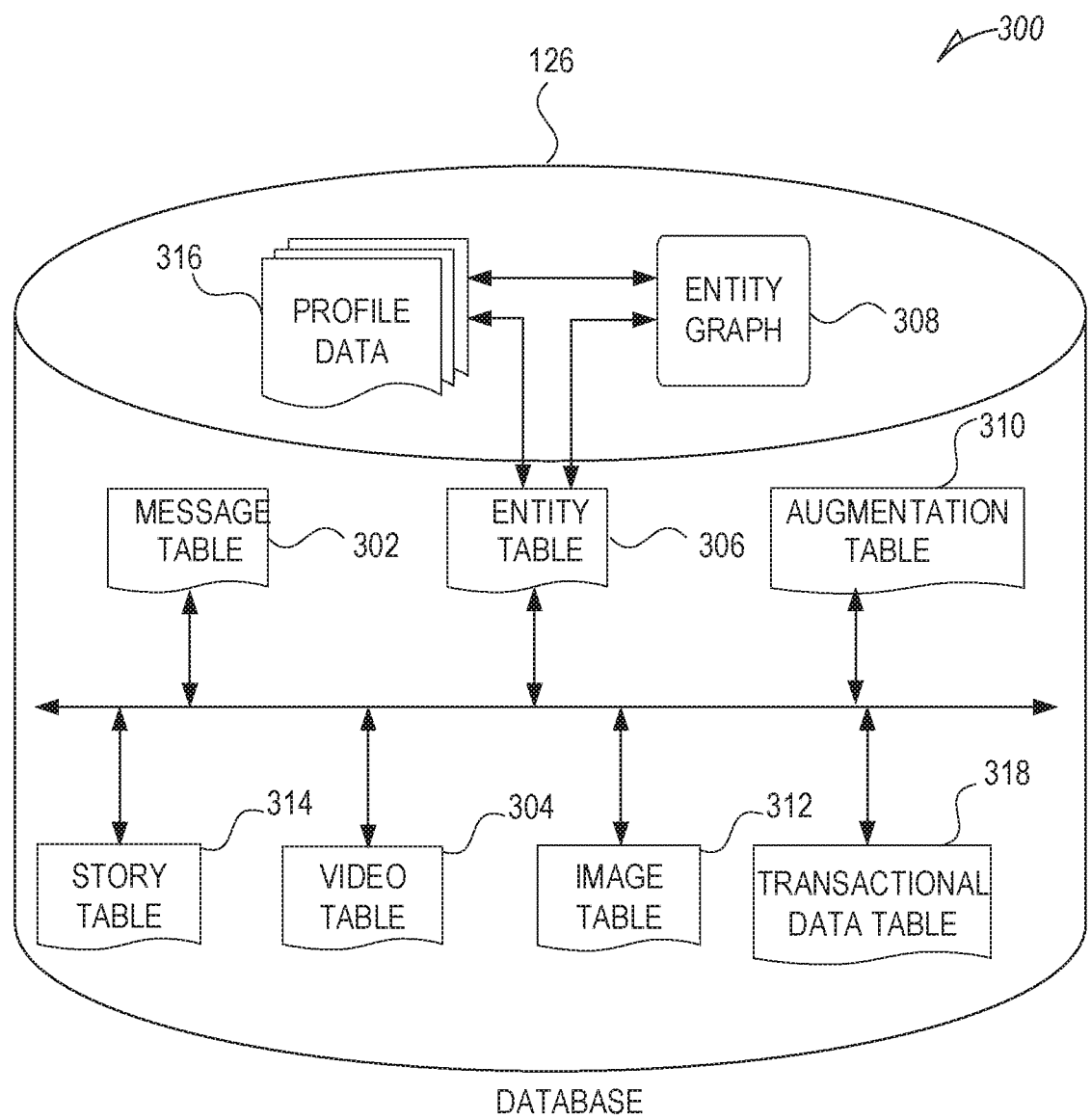
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., application 106, a mini-program, or an applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104, and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
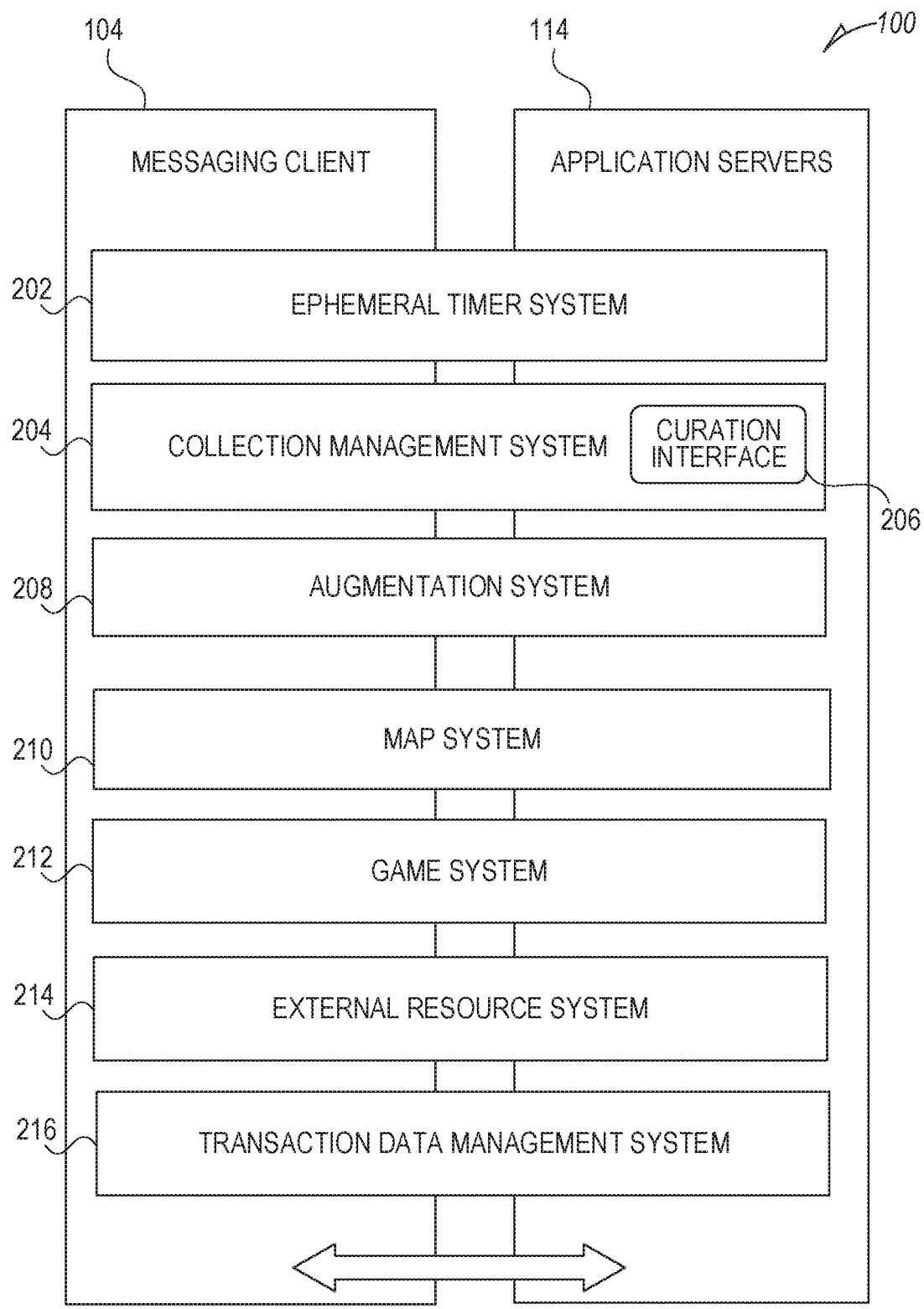
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and a transaction data management system.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. The external resources may be mini-programs. Each third-party server 110 hosts, for example, a markup language (e.g., HTML5) based application or small-scale version of an application (e.g., tickets, game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from the bottom or the middle of the screen, or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to the first type of user data (e.g., only two-dimensional avatars of users with or without different avatar characteristics). As another example, external resources that include small-scale versions of applications (e.g., web-based versions of applications) are provided with access to the second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, etc.

The transaction data management system 216 provides a secured payment flow for commercial transactions that allow users to purchase merchandise from the built-in e-commerce programs (e.g., mini-programs) hosted by the server 112 within the messaging system 100. The system 216 receives user requests from a web-based external resource, such as mini-programs, to process a payment transaction. The system 216 determines if all transactional data associated with the requesting user are stored in database 126. Specifically, the transactional data may be stored in transactional data table 318 in database 126. When the system 216 receives payment card information via user input, the system 216 transmits the information to a remote secured payment processor (not shown). The payment processor may return a desensitized data item (e.g., a payment token) representing payment card information. The system 216 stores the desensitized data item in the transactional data table 318.

In one embodiment, once the transaction data management system 216 determines all transactional data is present and ready to be sent out for payment processing, the system 216 transmits the transactional data to the secured payment processor. The secured payment processor returns a transaction status indicating whether the payment has gone through. If the returned transaction status indicates a complete transaction, the messaging system may provide for a display of a user interface that includes a third user interface element associated with a text display of "done," or "payment successful," indicating a complete transaction. If the returned transaction status indicates an incomplete transaction, the messaging system may provide for a display of a user interface that includes a user interface element associated with a text display of "transaction not completed," indicating an incomplete transaction.

In one embodiment, the transaction data management system 216 determines if the delivery of merchandize requires shipping. Once the system 216 determines if the shipping is unnecessary for the delivery, the system 216 may exclude shipping information from the determination of transactional data. In addition, system 216 may also withhold user interface elements associated with shipping information from the user interface.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Figure 11:
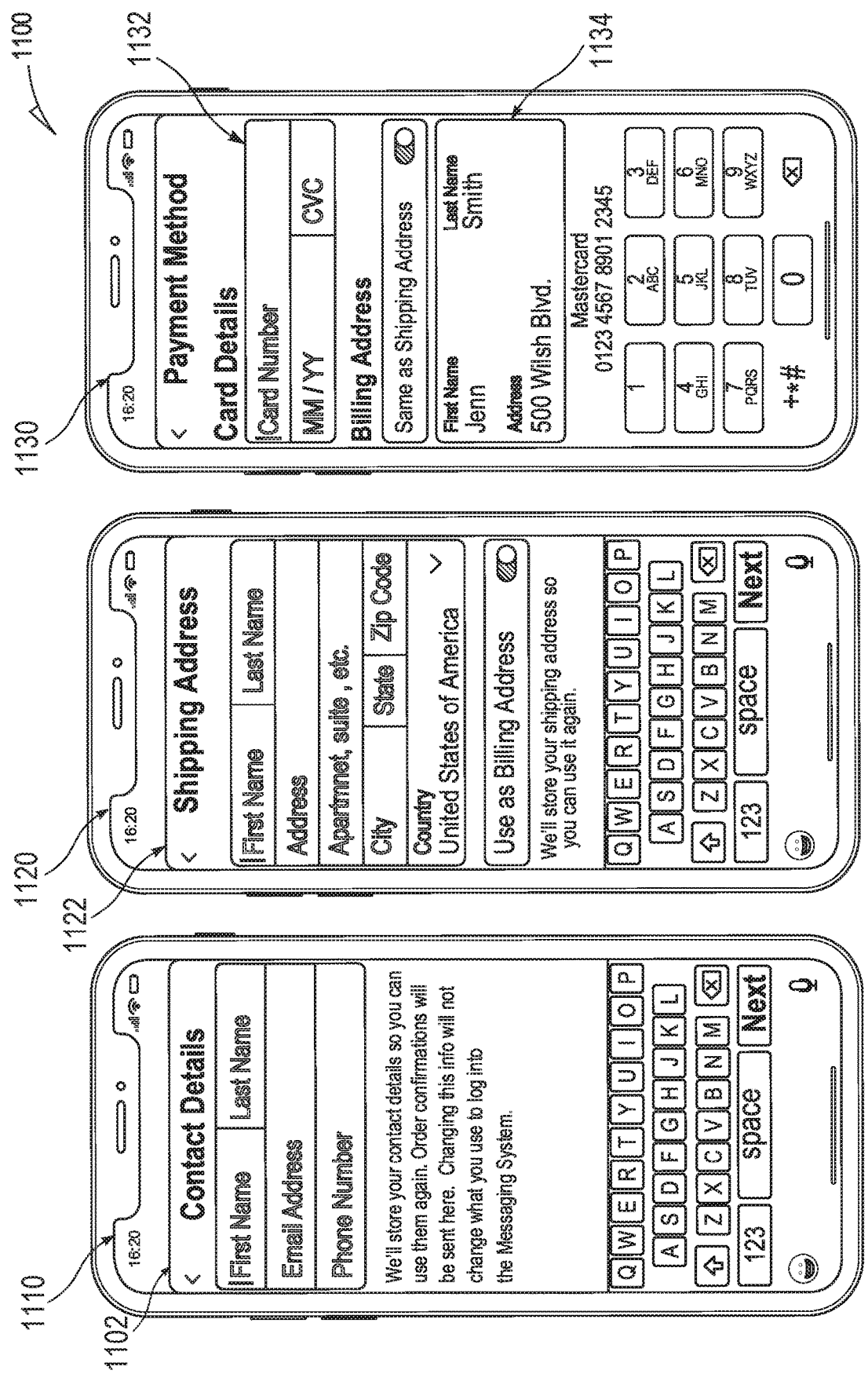
FIG. 11 illustrates a user interface 1100 displayed on a client device in accordance with one embodiment.

Transactional data table 318 stores transactional data associated with a user profile, including username, contact information, billing address, shipping address, and payment tokens. Transactional data may be entered via user interface 1100, as shown in FIG. 11. Once a user enters the data required for payment processing, the system 216 may automatically populate the data entry elements (e.g., text input fields) with the previously entered transactional data in the user interface 1100 the next time the user processes a payment transaction.

Data Communications Architecture

Figure 4:
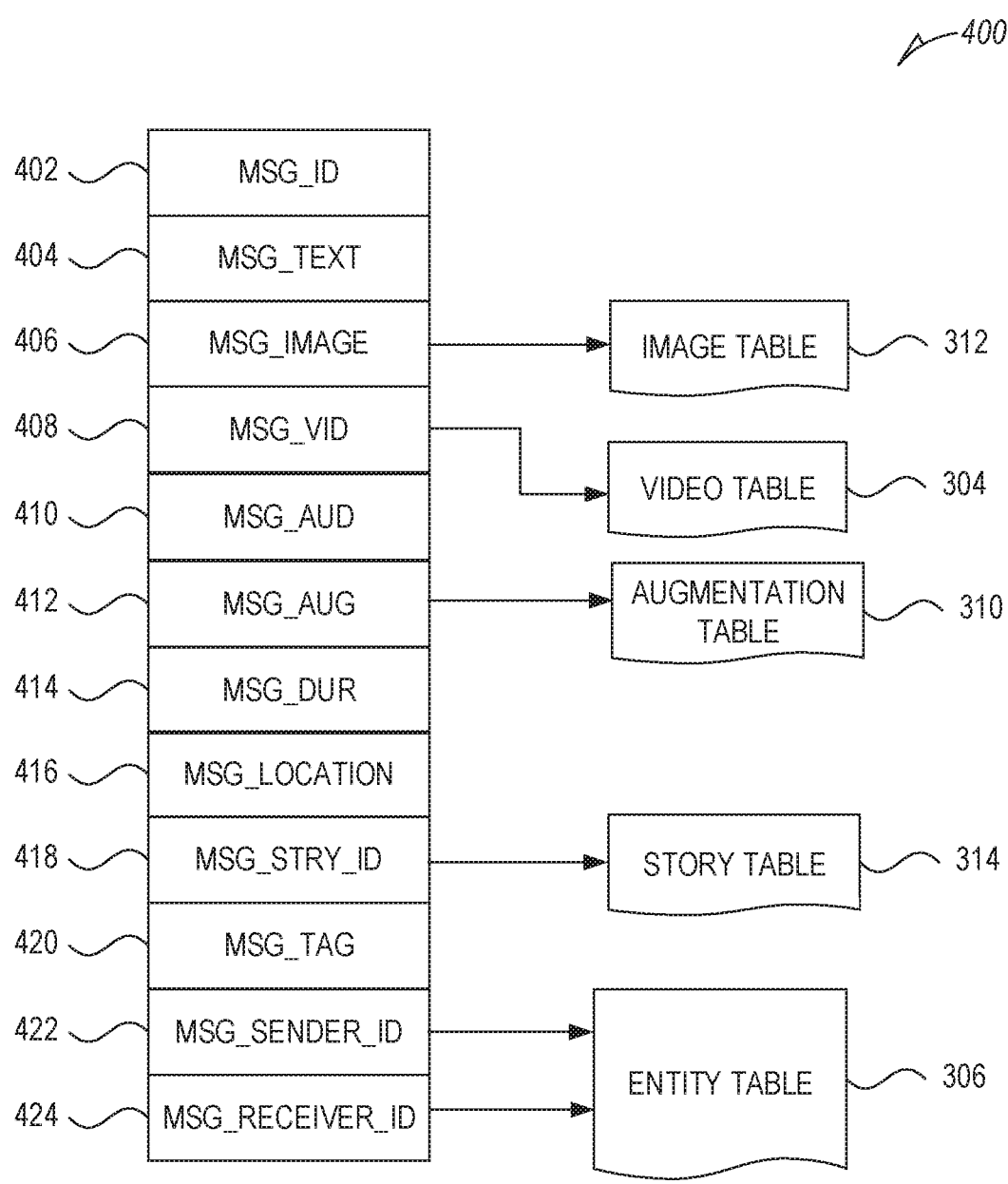
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
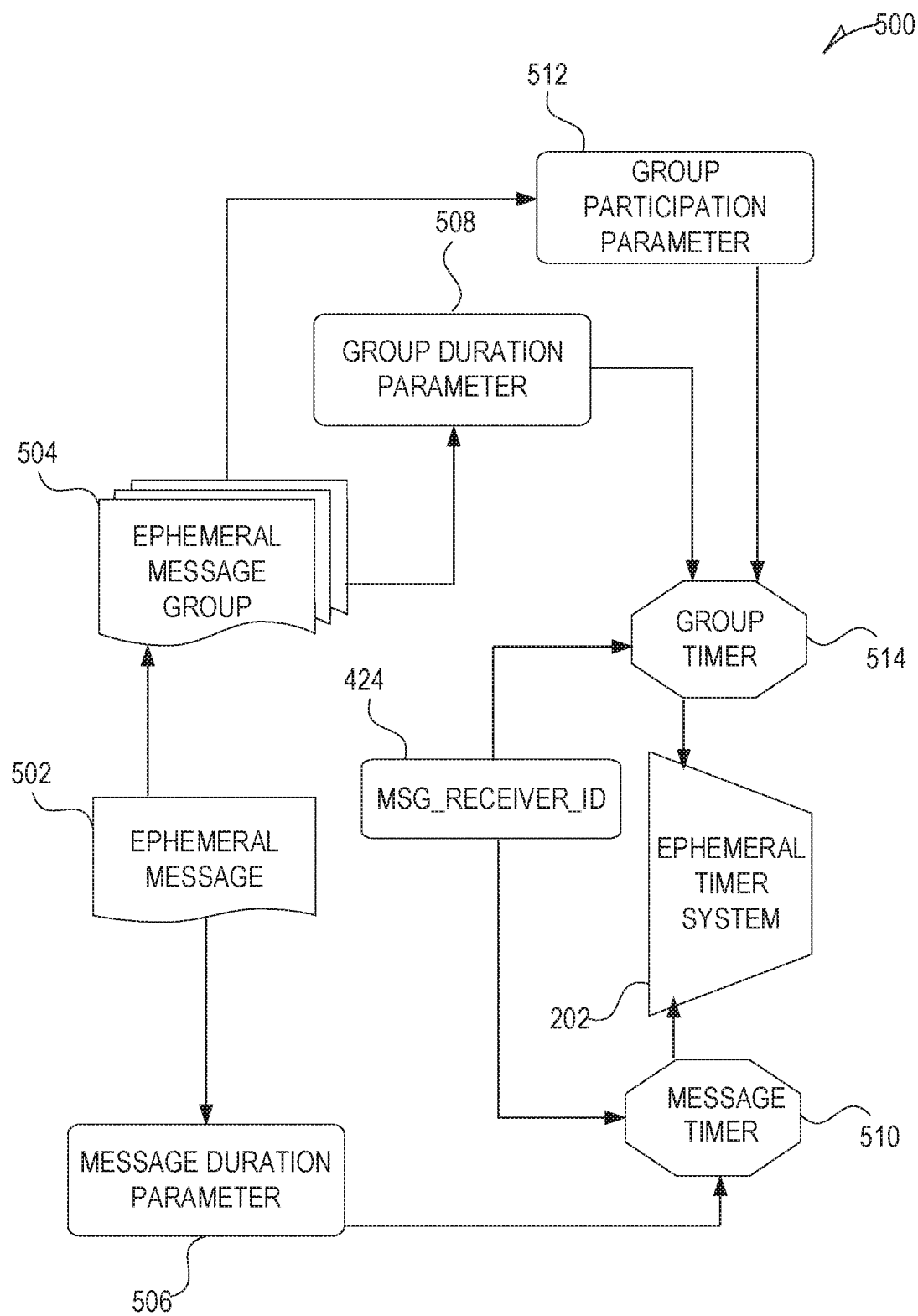
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Cross-Platform Data Management and Integration

In one embodiment, a requesting user may initiate a payment transaction process by activating a checkout button in a user interface of a mini-program. A mini-program may be hosted by application servers 112 in the messaging system 100, or alternatively, hosted by a third party server in an agnostic platform. A transaction data management system 216 determines if all transactional data associated with the requesting user are available in the database 126. In one embodiment, once all transactional data are determined to be available, the messaging system provides for a display the first user interface that includes an overview of the transactional data, and an interactive (e.g., slidable) user interface element (e.g., a first user-selectable element) corresponding to a completion of the payment transaction. Upon receiving an indication of user selection of the interactive user interface element representing a user decision to complete the transaction, the messaging system forwards the transactional data to a secured payment processor, which resides in a remote system agnostic to the messaging system 100. The secured payment processor returns a transaction status indicating if the payment card has been successfully charged. Alternatively, the payment processor may notify the mini-program, which may transmit the transaction status back to the transaction data management system 216. A payment flow is thereby securely managed across multiples platforms for optimal user experience.

Figure 6:
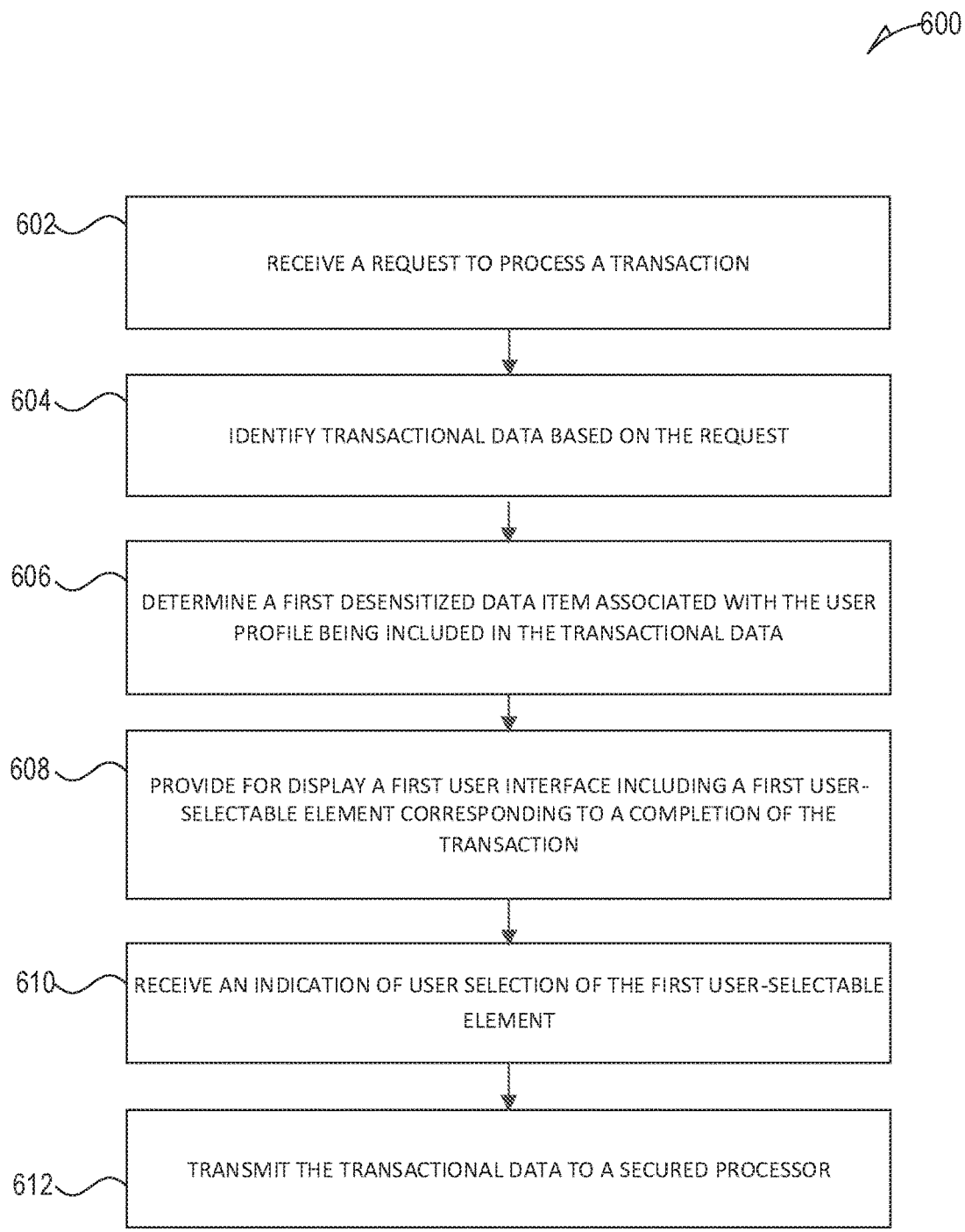
FIG. 6 illustrates a process 600 of completing a transaction in a messaging system in accordance with one embodiment.

FIG. 6 illustrates a process 600 of completing a transaction in a messaging system in accordance with one embodiment. The operations of process 600 may be performed by any number of different systems, such as the messaging client 104 described herein or the messaging server 114, or any portion thereof, such as a processor included in any of the systems, including the transaction data management system 216 and the external resource system 214.

Figure 8:
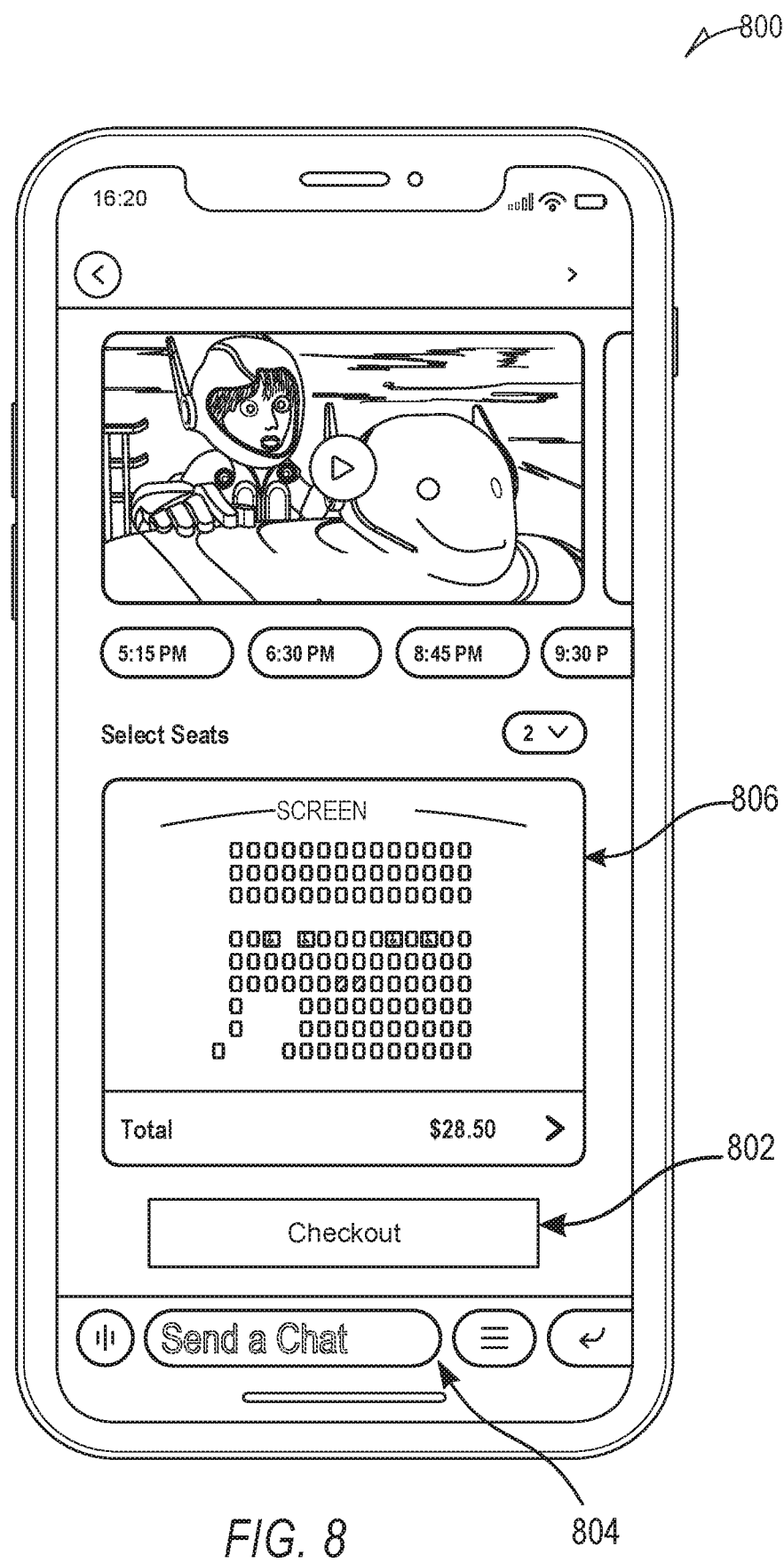
FIG. 8 illustrates a user interface 800 displayed on a client device in accordance with one embodiment.

At operation 602, the processor receives a request to process a payment transaction. The request may be received by a messaging application 104 implemented on a client device 102 from a web-based external resource (e.g., a mini-program). FIG. 8 illustrates a user interface 800 generated by the processor for the mini-program. The user interface 800 includes a user interface icon 802. The icon 802 includes a text indicator, such as "checkout," indicating the activation (e.g., tapping) of the icon 802 may send the request to process a payment transaction.

At operation 604, the processor identifies transactional data based on the request. The transactional data corresponds to a user profile associated with the client device 102 in an entity graph 308. Specifically, the requesting user is associated with a user profile in the entity graph 308, and the user profile is associated with the transactional data of the requesting user. The transactional data is stored in the transactional data table 318. The transactional data may include username, contact information (e.g., email address and phone number), billing address, shipping address, and desensitized data items, such as payment tokens.

At operation 606, the processor determines a first desensitized data item associated with the user profile being included in the transactional data. The first desensitized data item may be a payment token. A payment token is a reference or an identifier of sensitive data (e.g., payment card information) as a result of the tokenization process. Tokenization is a process of substituting a sensitive data element with a non-sensitive equivalent, such as a payment token that has no extrinsic or exploitable meaning or value. In one embodiment, there may be multiple payment tokens associated with a user profile, as a user may enter the information of multiple payment cards into the messaging system. The processor may identify the multiple payment tokens (e.g., the first desensitized data items) and determine the most recently added payment card. Alternatively, the processor may identify the most recently chosen one in the previous payment transaction to be associated with the transactional data for the current payment transaction.

Figure 9:
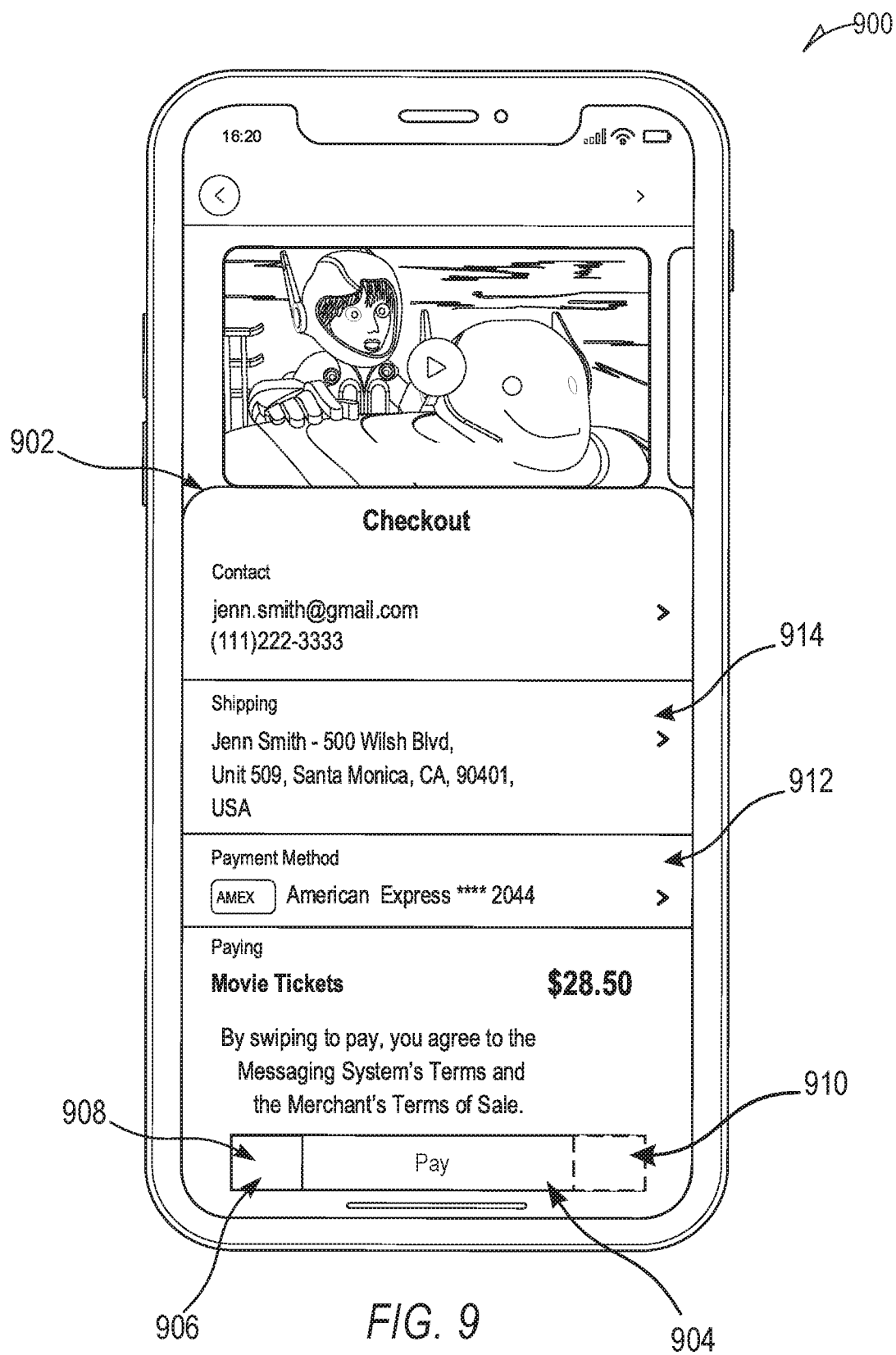
FIG. 9 illustrates a user interface 900 displayed on a client device in accordance with one embodiment.

At operation 608, the processor provides for display, within a user interface of the web-based external resource, a first user interface of the messaging application includes a first user-selectable element corresponding to a completion of the transaction. Specifically, as shown in FIG. 9, the first user interface may be the partial-screen user interface 902 within the user interface 900, and the first user-selectable element may be the interactive user interface element 904.

At operation 610, the processor receives an indication of user selection of the first user-selectable element. As shown in user interface 902 (e.g., the first user interface), the first user-selectable element 904 includes a slidable icon 906 that may be relocated based on the direction of user hand gesture (e.g., pressing against the screen and sliding) from a first position 908 to a second position 910. When the slidable icon 906 reaches the second position 910, the first user-selectable element is activated.

At operation 612, the processor transmits the transactional data to a secured payment processor for payment processing. Specifically, in response to the first user-selectable element being activated, the processor transmits the transactional data to a secured payment processor and waits for a returned transaction status indicating whether the payment has been successfully processed. If the returned transaction status indicates a complete transaction, the messaging system may provide for a display of a user interface that includes a third user interface element associated with a text display of "done," or "payment successful," indicating a complete transaction. If the returned transaction status indicates an incomplete transaction, the messaging system may provide for a display of a user interface that includes a user interface element associated with a text display of "transaction not completed," indicating an incomplete transaction. In one embodiment, upon receiving the transaction status indicating a complete payment transaction, the processor informs the web-based external resource (e.g., mini-program) to finalize the requested transaction. Finalizing the requested transaction may include completing any remaining process associated with the transactions upon a successful payment transaction, such as completing the reservation of the movie tickets, and sending the requesting user the reserved movie tickets via emails or messages, etc.

In one embodiment, upon receiving the indication of a user selection of the first user-selectable element, the processor provides for the display of a first user interface icon pending the receipt of the transaction status from the secured processor. The first user interface icon may be an animated icon representing a decision being in progress (e.g., a "loading" bar or gif image).

Figure 7:
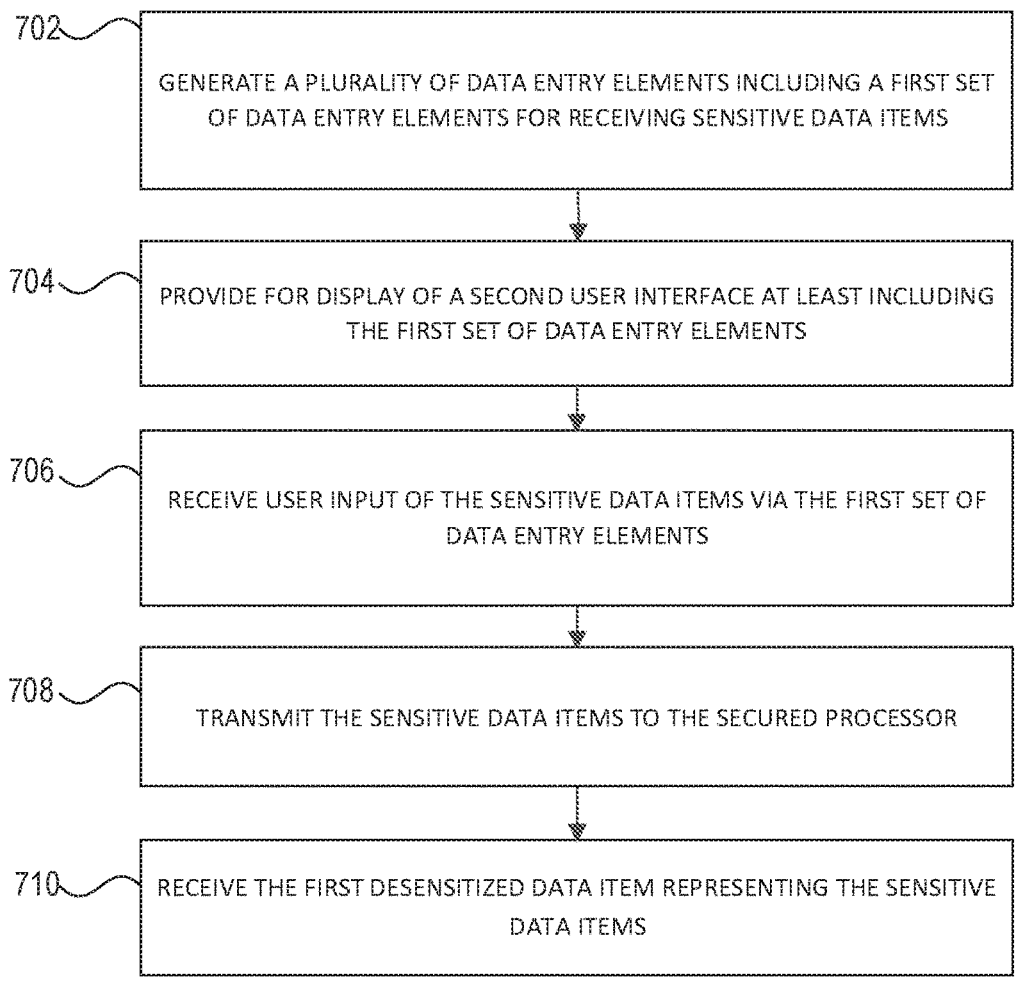
FIG. 7 illustrates a process 700 of generating a desensitized data item in accordance with one embodiment.

FIG. 7 illustrates a process 700 of generating a desensitized data item in accordance with one embodiment. Desensitized data items may be payment tokens. Payment card information is subject to Payment Card Industry "PCI" compliance standards, which require merchants to stores such sensitive information in a secure manner to reduce the likelihood of data breaches and fraudulent actions. The messaging system does not store payment card information, such as card number, expiration date, and CVC number. Instead, it stores the corresponding desensitized data items, such as payment tokens. A payment token is a reference or an identifier of sensitive data (e.g., payment card information) that has no extrinsic or exploitable meaning or value.

At operation 702, the processor generates a plurality of data entry elements. The plurality of data entry elements includes a first set of data entry elements for receiving sensitive data items, such as payment card information. As shown in FIG. 11, the plurality of data entry elements may include the first set of data entry elements 1132 for receiving payment card information, the second set of data entry elements 1122 for receiving shipping address information, and the third set of data entry elements 1102 for receiving user name and contact information including email address and phone number. In one embodiment, the first set of data entry elements refer to both data entry elements 1132 and 1134.

At operation 704, the processor provides for a display of a second user interface at least including the first set of data entry elements. Specifically, the second user interface may be the user interface 1130, as shown in FIG. 11. The user interface 1130 includes the first set of data entry elements 1132 and 1134. A data entry element may be a text input field. For example, the first set of data entry elements 1132 include three individual text input fields, including card number, expiration date (e.g., MM/YY), and CVC code. In one embodiment, the second user interface may also include data entry elements 1122 (e.g., the second set of data entry elements) and 1102 (e.g., the third set of data entry elements).

At operation 706, the processor receives user input of the sensitive data items via the first set of data entry elements 1132 and 1134. Specifically, users may type the payment card information into the text input fields included in data entry elements 1132 and 1134. In one embodiment, the data entry elements 1132 and 1134 may be iframes hosted and implemented by the secured payment processor, that the user entering sessions and interactions with the iframes are isolated from the messaging system.

At operation 708, the processor transmits the sensitive data items to the secured payment processor. The messaging system does not store payment card information. Instead, it stores the corresponding desensitized data items, such as payment tokens. Specifically, without storing the payment card information to database 126, the processor transmits the payment card information directly to a third-party payment processor, which resides in a system that is agnostic to the messaging system. The system hosting the payment processor is compliant with the PCI standards.

At operation 710, the processor receives the first desensitized data item (e.g., payment token) representing the corresponding sensitive data items (e.g., payment card information). A payment token is a reference or identifier of the payment card information, and it may be represented by the first user interface display 912, as shown in user interface 900. The first user interface display 912 includes the last 4 digits of the payment card number (e.g., 2044), the provider of payment card (e.g., American Express), and a logo of the provider. The information associated with the first user display 912 may be stored in the transactional data table 318 in database 126.

In one embodiment, for each payment transaction, the processor causes the payment processor to generate a single-transaction payment token (e.g., the second desensitized data item) that is compatible with the system of the mini-program associated with a current transaction. The single-transaction payment token is specific to each transaction a user authorizes, independent from the first desensitized payment token generated by the secured payment processor.

In one embodiment, the processor determines if the mini-program associated with the pending transaction is registered with the secured payment processor (e.g., the secured processor). The determination may be based on the verification process of the registration status returned by the secured payment processor. If the mini-program is registered with the secured payment processor, the processor causes the secured payment processor to generate reference metadata corresponding to the first desensitized data item. The reference metadata serves as a pointer, within the system of the secured payment processor, to the actual payment card information (e.g., sensitive data item) entered by the user. The processor causes the secured payment processor to generate a second desensitized data item based on the reference metadata, and causes the secured payment processor to return the second desensitized data item to the messaging system.

In one embodiment, if the mini-program is not registered, or unregistered with the secured payment processor, that it is instead registered or partnered with another payment processor (e.g., a second payment processor), the processor may cause the secured payment processor to generate a single-use data item (e.g., one-time-use card) and forward the single-use data item to the second payment processor. The processor may receive, either from the secured payment processor or directly from the second payment processor, a single-transaction payment token (e.g., the second desensitized data item) generated by the second payment processor based on the single-use data item. The processor may transmit the second desensitized data item in conjunction with the transactional data to the secured payment processor for payment processing. In one embodiment, the single-use data item generated by the secured payment processor includes a payment card number with the last four digits identical to the last four digits of the actual payment card number (e.g., transaction instrument identifier) entered by the user.

In one embodiment, the processor stores the single-transaction payment token (e.g., the second desensitized data item) in the transactional data table 318 in the database 126. The single-transaction payment token is for one-time use only and is specific to each transaction a user has authorized to proceed. Unlike the first desensitized data item, the second desensitized data item may not be included in the transactional data in the future payment transactions.

FIG. 8 illustrates a user interface 800 displayed on a client device 102 in accordance with one embodiment. In one embodiment, users may select a user interface icon representing a mini-program, such as a mini-program that provides theatrical event (e.g., movie tickets, concert tickets, theater tickets) booking service, from a direct messaging user interface (not shown). The user selection may cause the processor to generate and display the user interface 800. In one embodiment, users may select movie time, the number of tickets, and seat positions from the user interface 800. In addition, users may maintain conversations in the previous direct messaging user interface by continuing to send messages via the message input display 804. The message input display 804 may support all types of message input and transmit, including ephemeral messages 502, and media content items such as images, audios, or videos. Therefore, users do not need to leave the mini-programs to go back to the direct messaging user interface to maintain the conversations.

In one embodiment, when the processor detects more than one user is assessing the user interface 800 of the mini-program, the processor causes the user interface 800 to display seat reservations in real-time in response to one or more users' interaction with the respective client devices 102. For example, while engaging in a conversation in user interface 800, a first user may block off two seats in the seat selection user interface display 806, indicating the choice of seats via the user interface 800 from the associated first client device 102. The processor causes the user interface 800 on a second client device 102 to display in real-time or simultaneously the first user's seat selection. The second user, while conversing with the first user, is informed of the user interface interaction by the first user in real-time. In one embodiment, the processor may generate and display avatars associated with each user to reflect the real-time interactions by all the users present in the user interface 800. This way, all users may be able to view in the shared user interface 800 each other's choice of seats, the number of seats, movie time, etc.

In one embodiment, the processor displays a user interface element in the direct messaging user interface, indicating if all users have requested to process the payment transaction via activating the user interface icon 802 on the respective client devices 102. Once all users have submitted such request, the processor generates the partial-screen user interface 902 on all associated client devices 102. In one embodiment, if the processor detects one or more user fails to activate the interactive user interface element 904, the processor withholds all transactional data associated with the remaining users to be transmitted to the secured payment processor. This way, none of the payment transactions will be processed before all users confirm the payment via the partial-screen user interface 902.

FIG. 9 illustrates a user interface 900 displayed on a client device in accordance with one embodiment. Once the processor has received the request to process a payment transaction and determined that all transactional data associated with the requesting user is available, the processor may generate the partial-screen user interface 902 (e.g., the first user interface) within the user interface 900. The user interface 902 includes all transactional data that is required for processing the payment transaction. In one embodiment, the processor determines whether the completion of the transaction requires an electronic delivery method. For example, a movie ticket may be delivered electronically, such as via emails, text messages, or in-app messages. The processor may then withhold a display of the second user interface display 914 from the partial-screen user interface 902. The processor may also withhold a display of the second set of data entry elements 1122 corresponding to shipping information from the second user interface, as shown in FIG. 11. In one embodiment, activation of the first user interface display 912 may cause the processor to generate and display the partial screen payment method user interface 1202, provided there are multiple payment tokens associated with the requesting user in the transactional data table 318.

Figure 10:
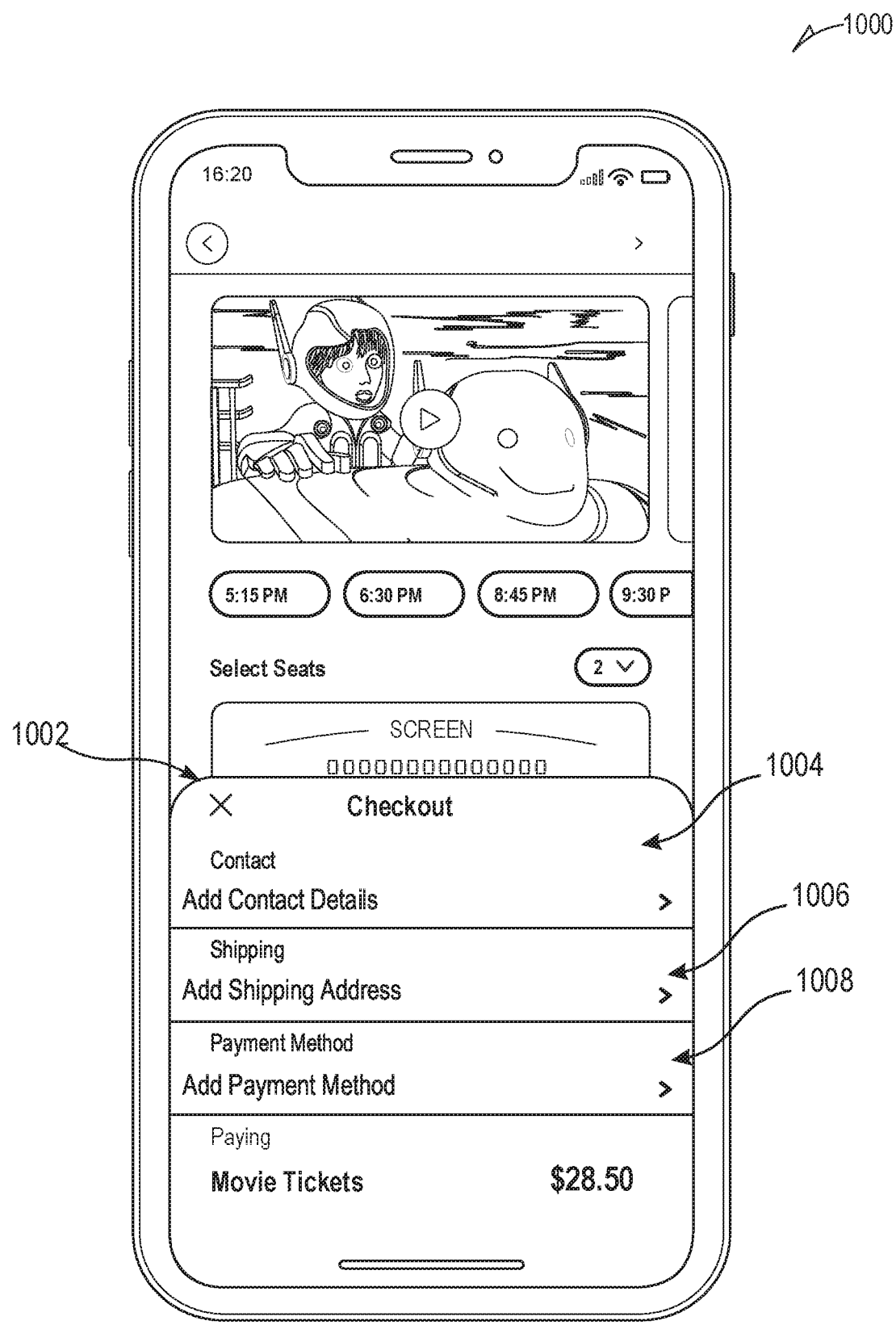
FIG. 10 illustrates a user interface 1000 displayed on a client device in accordance with one embodiment.

FIG. 10 illustrates a user interface 1000 displayed on a client device in accordance with one embodiment. Upon determining all of the transactional data is missing from the transactional data table 318, in response to receiving a user request to process a payment transaction by activating the user interface icon 802, the processor may generate a partial screen onboarding user interface 1002. The user interface 1002 includes a plurality of user-selectable items 1004, 1006, and 1008, and each item corresponds to a type of transactional data required for the payment transaction. Users may activate the user-selectable items by tapping on each item on the user interface. Activation of item 1004 may cause the processor to generate and display the user interface 1110 on the client device 102. Activation of item 1006 may cause the processor to generate and display the user interface 1120 on the client device 102. Activation of item 1008 may cause the processor to generate and display the user interface 1130 on the client device 102. In one embodiment, once the processor determines shipping information is not required for the purpose of the transaction, the processor may withhold item 1006 from the partial screen onboarding user interface 1002.

FIG. 11 illustrates a user interface 1100 displayed on a client device in accordance with one embodiment. The second user interface may include the first set of data entry elements 1132 and 1134. In one embodiment, the second user interface may also include the second set of data entry elements 1122 and the third set of data entry elements 1102. The processor determines the completion of the transaction requires an electronic delivery method. For example, a movie ticket may be delivered electronically, such as by emails, text messages, or in-app messages. The processor may then withhold a display of the second set of data entry elements from the second user interface. Specifically, the second user interface may only include the first set of data entry elements 1132 and 1134, and the third set of data entry elements 1102 is withheld from the display.

Figure 12:
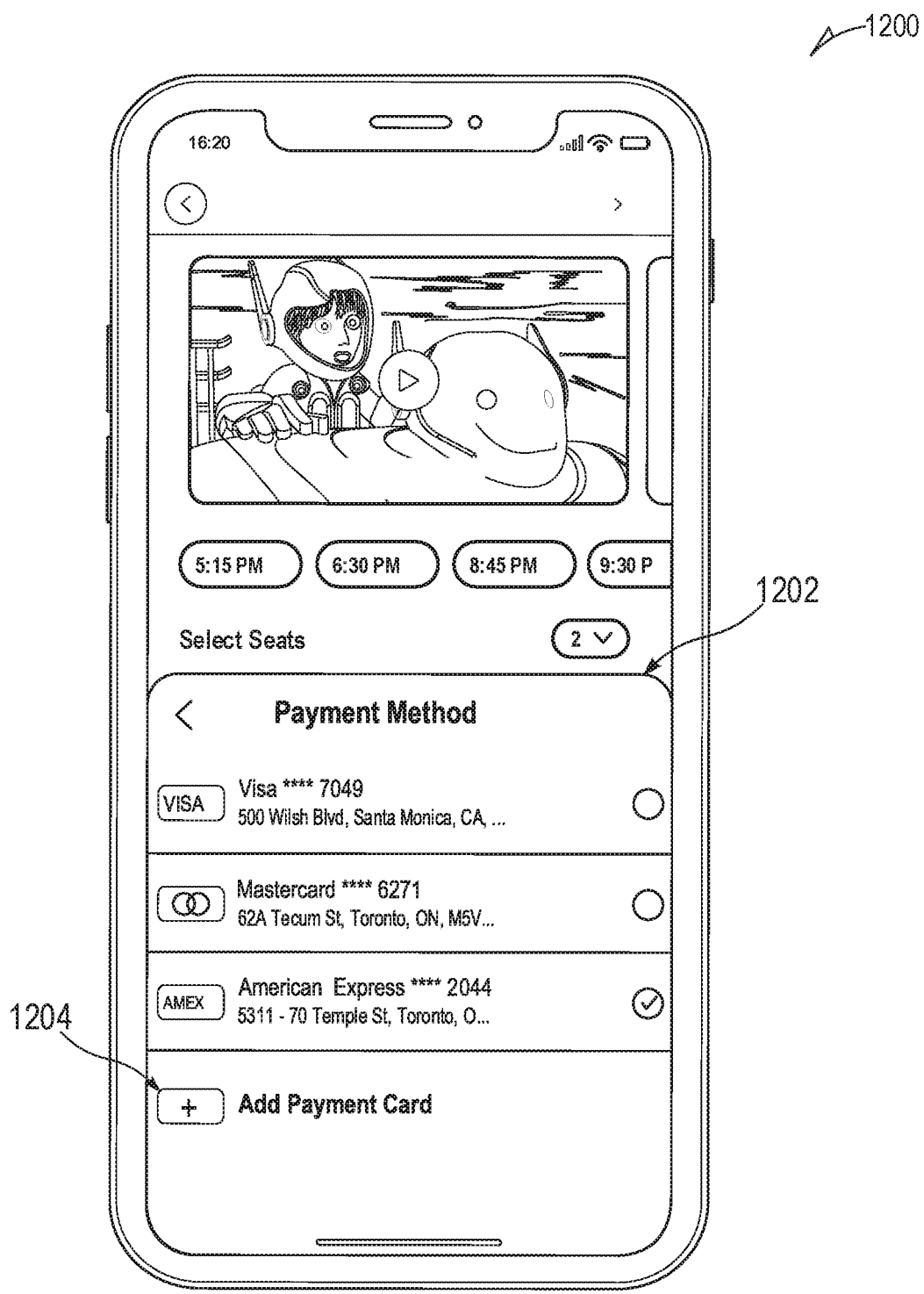
FIG. 12 illustrates a user interface 1200 displayed on a client device in accordance with one embodiment.

FIG. 12 illustrates a user interface 1200 displayed on a client device in accordance with one embodiment. The user interface 1200 includes a partial screen payment method user interface 1202. The user interface 1202 includes a display of information representing multiple payment tokens. The display of each representation includes the last four digits of the payment card numbers, the providers of payment cards, and the logos of the providers. The user interface 1200 also includes a user-selectable icon 1204. Via user selection, the activation of icon 1204 may cause the processor to generate the user interface 1130 that includes the first set of data entry elements 1132 and 1134.

Figure 13:
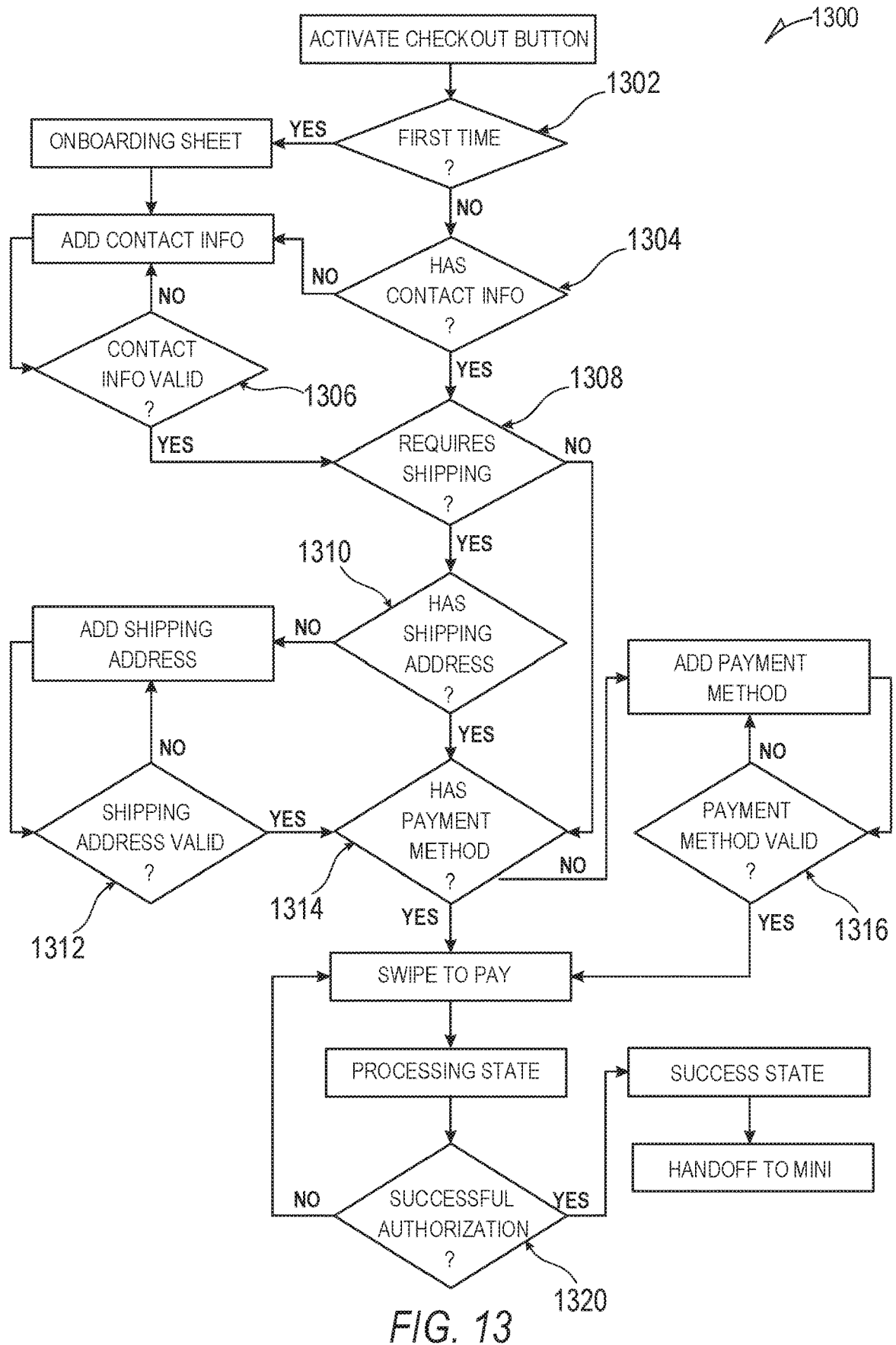
FIG. 13 illustrates a process 1300 of completing a transaction in a messaging system in accordance with one embodiment.

FIG. 13 illustrates a process 1300 of completing a transaction in a messaging system in accordance with one embodiment. The identification process of transactional data may be carried out in sequential order. Specifically, upon receiving a request to process a payment transaction, the processor, at operation 1302, determines if it is the first time for the user to request a transaction process within the messaging system 100. If it is the first time, the processor may generate one or more user interfaces (e.g., onboarding sheet), such as the second user interface mentioned above, or the user interfaces 1110, 1120, and 1130, in order to collect transactional data associated with the requesting user. The processor first determines if contact information is available (operation 1304). The processor may generate and cause display of the user interface 1103 for collecting contact information. A validation operation 1306 is carried out to verify if the contact information received is valid. The processor then determines if the transaction requires shipping (operation 1308). If the transaction requires shipping, then the processor collects the shipping address via a user interface (e.g., user interface 1120) and verifies if the address is valid (operation 1312). The processor, in the last, determines if a valid payment token is associated with the requesting user (operation 1314). The processor may generate and display the user interface 1130 for collecting payment information. Upon receiving the valid payment information, the processor transmits the payment information, including card number, expiration date, CVC code, and optionally, the billing address directly to the secured payment processor. The processor then may store the returned payment token in the transactional data table 318. The payment token corresponds to the payment information handled by the payment processor. Once all transactional data is available, the requesting user may authorize the payment transaction by activating the interactive user interface element 904 (e.g., the first user-selectable element) in the partial-screen user interface 902, as shown in FIG. 9, for example. Based on the returned transaction status (e.g., processing state) from the secured payment processor, the processor determines if the payment transaction has been completed (operation 1320).

Machine Architecture

Figure 14:
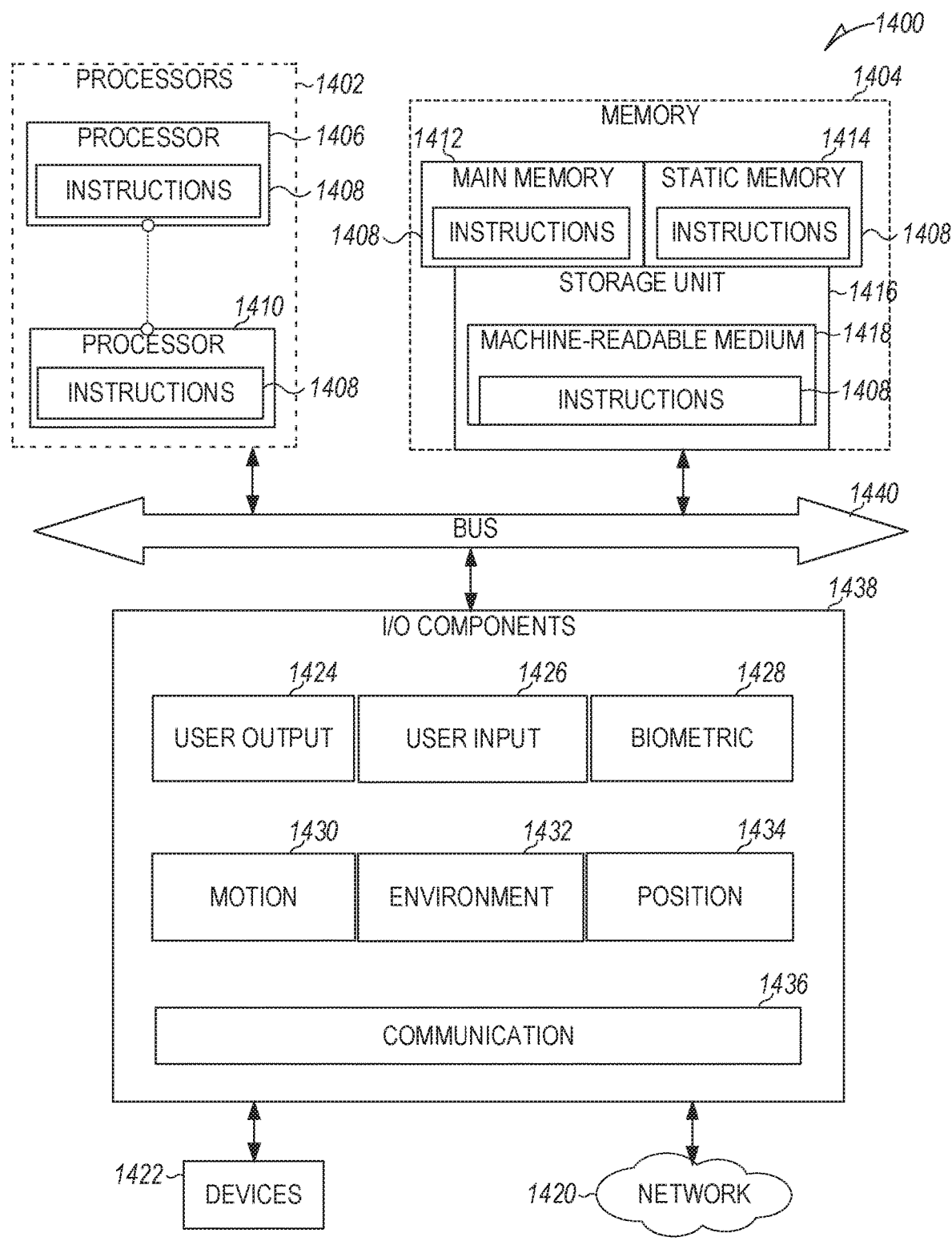
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1402, memory 1404, and input/output I/O components 1438, which may be configured to communicate with each other via a bus 1440. In an example, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1406 and a processor 1410 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single-core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1440. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the processor's cache memory), or any suitable combination thereof, during execution thereof by the machine 1400.

The I/O components 1438 may include a wide variety of components to receive input, provide output, produce output, transmit information, exchange information, capture measurements, and so on. The specific I/O components 1438 that are included in a particular machine will depend on the type of machine. For example, portable machines such as mobile phones may include a touch input device or other such input mechanisms, while a headless server machine will likely not include such a touch input device. It will be appreciated that the I/O components 1438 may include many other components that are not shown in FIG. 14. In various examples, the I/O components 1438 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1438 may include biometric components 1428, motion components 1430, environmental components 1432, or position components 1434, among a wide array of other components. For example, the biometric components 1428 include components to detect expressions (e.g., band expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1430 include acceleration sensor components (e.g., accelerometer), gravitation sensor components, rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1438 further include communication components 1436 operable to couple the machine 1400 to a network 1420 or devices 1422 via respective coupling or connections. For example, the communication components 1436 may include a network interface component or another suitable device to interface with the network 1420. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1412, static memory 1414, and memory of the processors 1402) and storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed examples.

The instructions 1408 may be transmitted or received over the network 1420, using a transmission medium, via a network interface device (e.g., a network interface component included in the communication components 1436) and using any one of several well-known transfer protocols (e.g., hypertext transfer protocol (HTTP)). Similarly, the instructions 1408 may be transmitted or received using a transmission medium via a coupling (e.g., a peer-to-peer coupling) to the devices 1422.

Software Architecture

Figure 15:
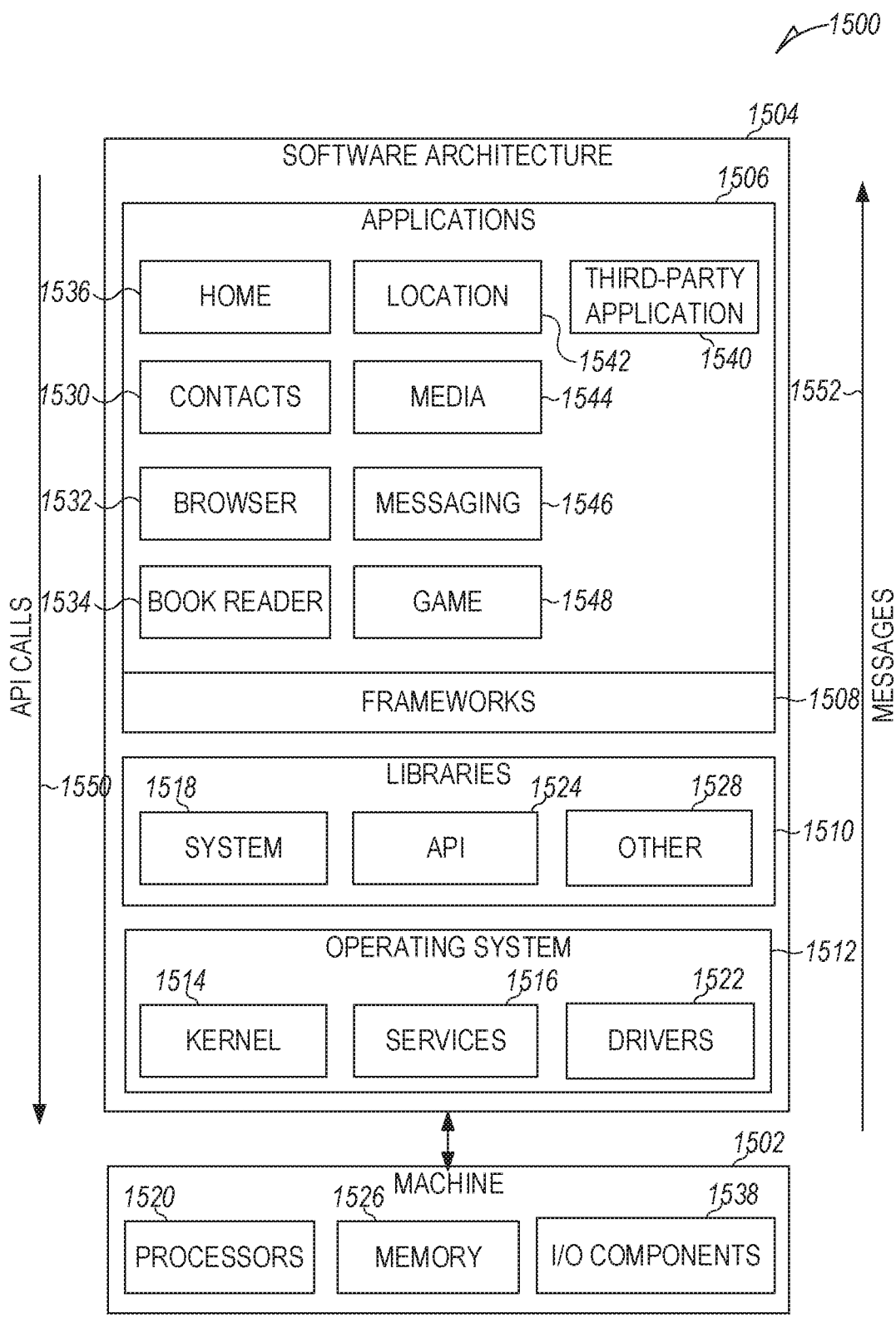
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as JOS™ ANDROID™, WINDOWS® Phone, or another mobile operating system. In this example, the third-party application 1540 can invoke the API calls 1550 provided by the operating system 1512 to facilitate functionality described herein.

Processing Components

Figure 16:
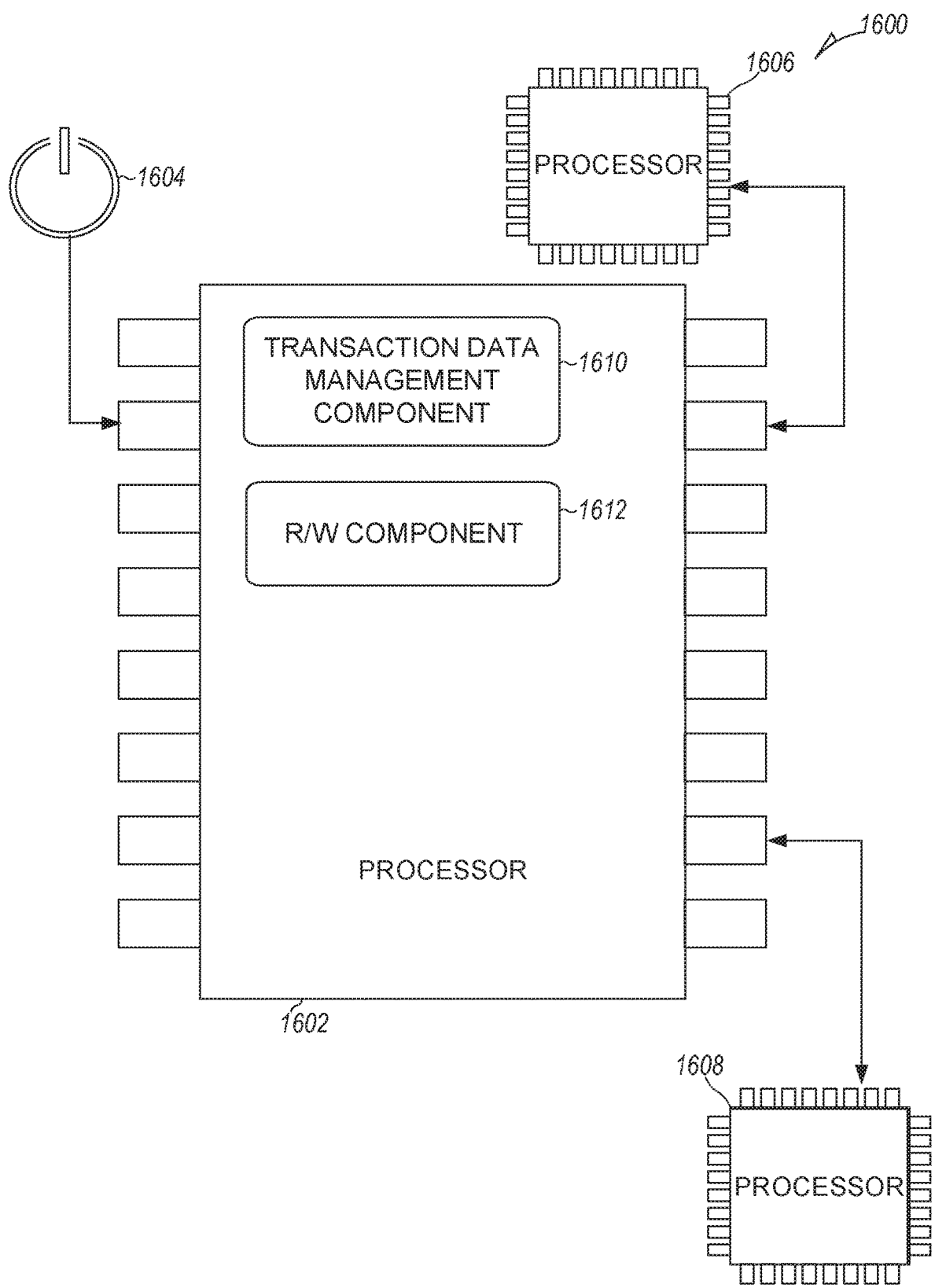
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely a transaction data management component 1610 and an R/W component 1612. The transaction data management component 1610 operationally manages and processes payment transactions across multiple platforms or systems. The R/W component 1612 operationally manages data read and write during the normal computer processing cycles to support various functions as described above. As illustrated, the processor 1602 is communicatively coupled to both the processor 1606 and the processor 1608.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1606 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
receiving, by a server via a messaging application implemented on a client device, from a web-based external resource, a request to process a transaction;
identifying, by the server, transactional data based on the request, the transactional data corresponding to a user profile associated with the client device in an entity graph;
determining, by the server, a first desensitized data item based on the transactional data;
providing for display, by the server via the messaging application implemented on the client device, within a user interface of the web-based external resource, a first user interface of the messaging application including a first user-selectable element corresponding to a completion of the transaction;
receiving, by the server via the messaging application implemented on the client device, an indication of user selection of the first user-selectable element; and
transmitting, by the server, the transactional data to a secured payment processor.

2. The method of claim 1, further comprising:
upon determining that the web-based external resource is registered with the secured payment processor, causing, by the server, the secured payment processor to generate reference metadata associated with the first desensitized data item;
receiving, by the server from the secured payment processor, a second desensitized data item corresponding to the first desensitized data item; and
transmitting, by the server, the second desensitized data item in conjunction with the transactional data to the secured payment processor.

3. The method of claim 1, further comprising:
upon determining that the web-based external resource is unregistered with the secured payment processor, causing, by the server, the secured payment processor to generate a single-use data item;
receiving, by the server, a second desensitized data item corresponding to the single-use data item; and
transmitting, by the server, the second desensitized data item in conjunction with the transactional data to the secured payment processor.

4. The method of claim 3, wherein the single-use data item includes a last four digits of a transaction instrument identifier associated with the first desensitized data item.

5. The method of claim 1, further comprising:
receiving, by the server, an indication of a receipt of a transaction status from the secured payment processor or the web-based external resource;

determining, by the server, the transaction status corresponding to an incomplete transaction; and providing, by the server, for display of a second user-selectable element corresponding to the incomplete transaction.

6. The method of claim 1, further comprising:

receiving, by the server, an indication of a receipt of a transaction status from the secured payment processor or the web-based external resource;

determining, by the server, the transaction status corresponding to a complete transaction; and providing, by the server, for display of a third user interface element corresponding to the complete transaction.

7. The method of claim 6, further comprising:

upon receiving the indication of the receipt of the transaction status corresponding to the complete transaction, causing, by the server, the web-based external resource to finalize the transaction.

8. The method of claim 1, further comprising:

generating, by the server, a plurality of data entry elements, the plurality of data entry elements including a first set of data entry elements for receiving sensitive data items; and providing, by the server, for display of a second user interface at least including the first set of data entry elements.

9. The method of claim 8, further comprising:

receiving, by the server via the messaging application implemented on the client device, user input of the sensitive data items via the first set of data entry elements;

transmitting, by the server via the messaging application implemented on the client device, the sensitive data items to the secured payment processor; and receiving, by the server, the first desensitized data item representing the sensitive data items.

10. The method of claim 8, wherein the plurality of data entry elements includes a second set of data entry elements for receiving shipping data.

11. The method of claim 10, further comprising:

determining, by the server, a completion of the transaction requiring an electronic delivery method; and withholding, by the server, a display of the second set of data entry elements from the second user interface in response to determining the completion of the transaction requiring the electronic delivery method.

12. The method of claim 1, further comprising:

identifying, by the server, a plurality of desensitized data items associated with the user profile; and determining, by the server, a most recent desensitized data item generated by the secured payment processor or being involved in a previous transaction, and associating the most recent desensitized data item with the transactional data to be transmitted to the secured payment processor.

13. The method of claim 12, wherein the most recent desensitized data item is the first desensitized data item.

14. The method of claim 1, wherein the indication of user selection of the first user-selectable element includes a user-directed relocation of a second user interface icon included in the first user-selectable element.

15. A server system comprising:

one or more processors; and a non-transitory computer readable storage medium comprising instructions that when executed by the one or more processors, causing the one or more processors to perform operations comprising:

receiving, from a web-based external resource, a request to process a transaction;

identifying transactional data based on the request, the transactional data corresponding to a user profile in an entity graph;

determining a first desensitized data item based on the transactional data;

providing for display, within a user interface of the web-based external resource, a first user interface including a first user-selectable element corresponding to a completion of the transaction;

receiving an indication of user selection of the first user-selectable element; and transmitting the transactional data to a secured payment processor.

16. The server system of claim 15, wherein the one or more processors further perform operations comprising:

upon determining that the web-based external resource is registered with the secured payment processor, causing the secured payment processor to generate reference metadata associated with the first desensitized data item;

receiving, from the secured payment processor, a second desensitized data item corresponding to the first desensitized data item; and transmitting the second desensitized data item in conjunction with the transactional data to the secured payment processor.

17. The server system of claim 15, wherein the one or more processors further perform operations comprising:

upon determining that the web-based external resource is unregistered with the secured payment processor, causing the secured payment processor to generate a single-use data item;

receiving a second desensitized data item corresponding to the single-use data item; and transmitting the second desensitized data item in conjunction with the transactional data to the secured payment processor.

18. The server system of claim 17, wherein the single-use data item comprises a last four digits of a transaction instrument identifier associated with the first desensitized data item.

19. The server system of claim 15, wherein the one or more processors further perform operations comprising:

receiving an indication of a receipt of a transaction status from the secured payment processor or the web-based external resource;

determining the transaction status corresponding to a complete transaction; and providing for display of a third user interface element corresponding to the complete transaction.

20. A machine-readable non-transitory storage medium having instructions when executed by a processor of a server system, causing the processor of the server system to perform operations comprising:

receiving, from a web-based external resource, a request to process a transaction;

identifying transactional data based on the request, the transactional data corresponding to a user profile in an entity graph;

determining a first desensitized data item based on the transactional data;

providing for display, within a user interface of the web-based external resource, a first user interface including a first user-selectable element corresponding to a completion of the transaction;
receiving an indication of user selection of the first user-selectable element; and
transmitting the transactional data to a secured payment processor.

\* \* \* \* \*